(12) United States Patent
Norcutt et al.

(10) Patent No.: US 10,902,958 B2
(45) Date of Patent: Jan. 26, 2021

(54) MECHANICAL SEAL ASSEMBLY AND METHOD FOR SEALING AN OPENING IN A NUCLEAR POWER PLANT

(71) Applicant: Framatome Inc., Lynchburg, VA (US)

(72) Inventors: Lynn Norcutt, Lynchburg, VA (US);
Wesley Holley, Lynchburg, VA (US);
Ryan Melcher, Lynchburg, VA (US);
Timothy Wiger, Lynchburg, VA (US)

(73) Assignee: Framatome Inc., Lynchburg, VA (US)

( * ) Notice: Subject to any disclaimer, the term of this patent is extended or adjusted under 35 U.S.C. 154(b) by 48 days.

(21) Appl. No.: 15/944,430

(22) Filed: Apr. 3, 2018

(65) Prior Publication Data

US 2019/0304612 A1    Oct. 3, 2019

(51) Int. Cl.

| | |
|---|---|
| *F16L 55/162* | (2006.01) |
| *G21C 13/028* | (2006.01) |
| *F16L 41/06* | (2006.01) |
| *G21C 13/036* | (2006.01) |
| *F16L 55/163* | (2006.01) |
| *F16L 55/16* | (2006.01) |
| *G21C 19/20* | (2006.01) |

(Continued)

(52) U.S. Cl.
CPC .......... *G21C 13/028* (2013.01); *F16L 41/06* (2013.01); *F16L 55/162* (2013.01); *F16L 55/163* (2013.01); *F16L 55/1612* (2013.01); *G21C 13/036* (2013.01); *G21C 17/017* (2013.01); *G21C 19/207* (2013.01); *G21C 15/18* (2013.01); *G21C 19/22* (2013.01)

(58) Field of Classification Search
CPC .. F16J 13/04; F16L 55/10; F16L 55/11; F16L 55/115; F16L 55/1152

USPC ................ 138/89, 90, 92; 220/251
See application file for complete search history.

(56) References Cited

U.S. PATENT DOCUMENTS 3,094,238 A * 6/1963 Alastair .................. F16J 13/04
                                                       220/251
3,724,505 A * 4/1973 Jahn ........................ F16L 45/00
                                                       138/92

(Continued)

FOREIGN PATENT DOCUMENTS

| AU | 2011200231 A1 | 8/2011 |
| DE | 102009043734 A1 | 4/2011 |

*Primary Examiner* — Patrick F Brinson
(74) *Attorney, Agent, or Firm* — Davidson, Davidson & Kappel, LLC

(57) ABSTRACT

A method for sealing an opening extending radially from an outer circumferential surface to an inner circumferential surface of a tubular object in a nuclear power plant includes inserting a stopper from outside of the outer circumferential surface through the opening into the tubular object; and actuating a fastener from the outside of the circumferential surface to force the stopper radially outward to seal the opening. A mechanical seal assembly for plugging an opening in a tubular object by contacting an inner circumferential surface of the tubular object includes a stopper configured for insertion into an interior of the tubular object for plugging the opening. The stopper includes a surface configured for matching the inner circumferential surface of the tubular object. The mechanical seal assembly also includes a fastener passing through a hole in the stopper such that the fastener is actuatable from outside of the tubular object to force the surface of the stopper against the inner circumferential surface of the tubular object.

19 Claims, 8 Drawing Sheets

(51) Int. Cl.
 *G21C 17/017* (2006.01)
 *G21C 19/22* (2006.01)
 *G21C 15/18* (2006.01)

(56) References Cited

U.S. PATENT DOCUMENTS

| | | | | |
|---|---|---|---|---|
| 3,874,550 | A | * | 4/1975 | Gordon .................. F16J 13/04 220/213 |
| 4,493,344 | A | * | 1/1985 | Mathison ............... B65D 39/12 138/89 |
| 4,573,628 | A | | 3/1986 | Dohlen et al. |
| 5,408,883 | A | | 4/1995 | Clark, Jr. |
| 5,433,333 | A | * | 7/1995 | Martell ................. E04H 12/003 220/243 |
| 5,543,599 | A | * | 8/1996 | Cole ....................... B23H 9/00 219/69.17 |
| 5,839,192 | A | | 11/1998 | Weems et al. |
| 6,089,396 | A | * | 7/2000 | Pozek ................. F16B 23/0061 220/251 |
| 6,456,682 | B1 | | 9/2002 | Jensen |
| 6,622,747 | B2 | | 9/2003 | Sato et al. |
| 7,464,727 | B1 | * | 12/2008 | Larson .................. F16L 55/11 138/89 |
| 7,623,611 | B2 | * | 11/2009 | Jensen .................. G21C 15/18 376/352 |
| 7,871,111 | B2 | | 1/2011 | Jensen |
| 8,613,291 | B2 | | 12/2013 | Heffernan |
| 2003/0226412 | A1 | | 12/2003 | Rumminger et al. |

* cited by examiner

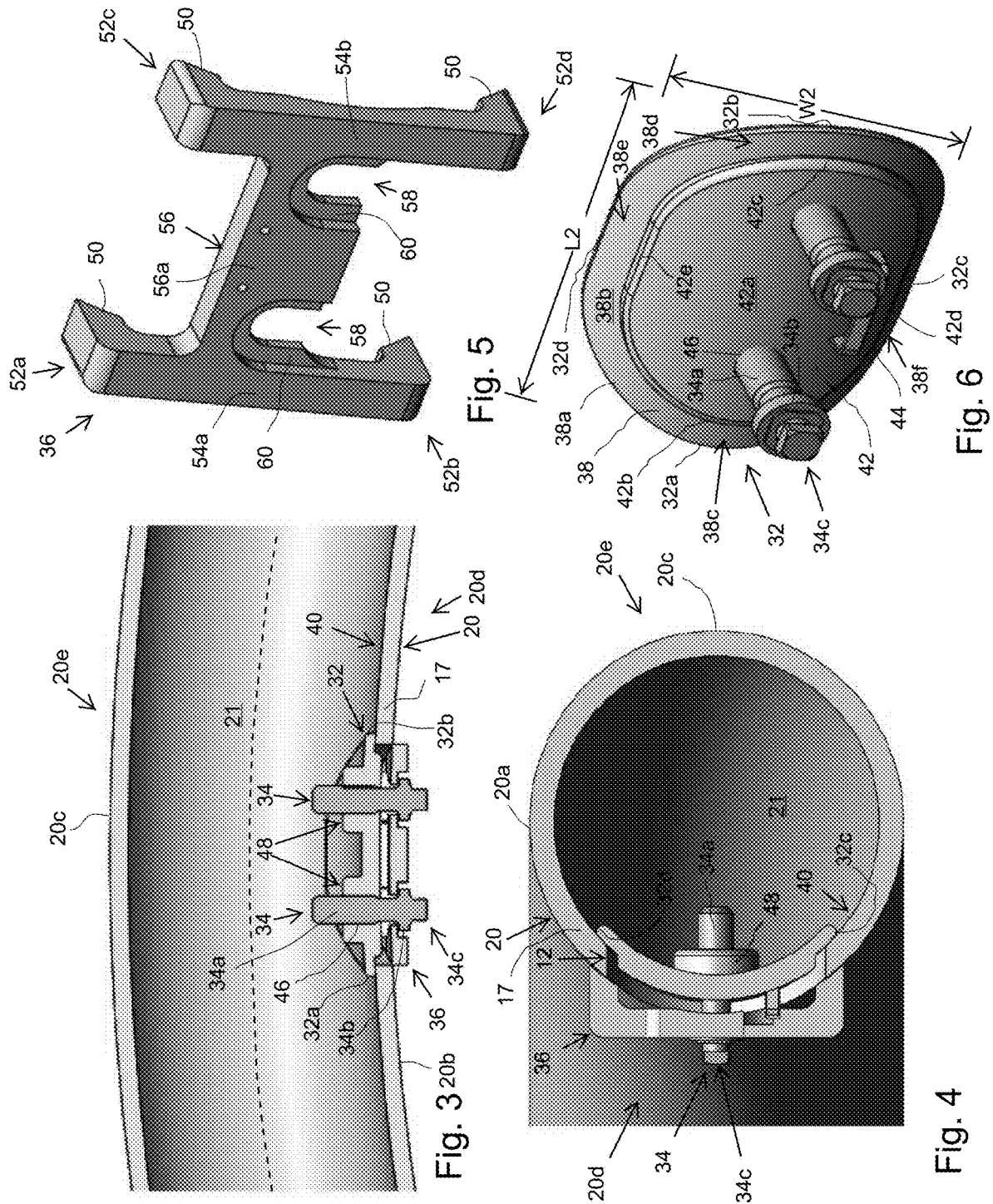

MECHANICAL SEAL ASSEMBLY AND METHOD FOR SEALING AN OPENING IN A NUCLEAR POWER PLANT

The present disclosure relates generally to method for sealing an opening extending radially from an outer circumferential surface to an inner circumferential surface of a tubular object in a nuclear power plant, more specifically for sealing an opening in a portion of a feedwater sparger in a nuclear pressure vessel.

BACKGROUND

U.S. Pat. No. 5,839,192 discloses clamping the outside of a BWR sparger, U.S. Pat. No. 7,871,111 discloses repairing flawed welded joint in a core spray piping system, U.S. Pat. No. 4,573,628 discloses a method for tapping into tubing of a nuclear power station, U.S. Pat. No. 5,408,883 discloses cutting an elliptical hole in nuclear steam generator tubing, U.S. Pat. No. 6,456,682 discloses a BWR core spray sparger T-box attachment with clamp.

SUMMARY OF THE INVENTION

A method for sealing an opening extending radially from an outer circumferential surface to an inner circumferential surface of a tubular object in a nuclear power plant includes inserting a stopper from outside of the outer circumferential surface through the opening into the tubular object; and actuating a fastener from the outside of the circumferential surface to force the stopper radially outward to seal the opening.

A method for removing material from an inaccessible region of an enclosure in a nuclear power plant includes cutting through a wall of the enclosure to form an opening passing through the wall; removing the material through the opening; inserting a stopper into the enclosure through the opening from outside of the enclosure; and then actuating a fastener from the outside of the enclosure to force the stopper against the wall to seal the opening.

A mechanical seal assembly for plugging an opening in a tubular object by contacting an inner circumferential surface of the tubular object includes a stopper configured for insertion into an interior of the tubular object for plugging the opening. The stopper includes a surface configured for matching the inner circumferential surface of the tubular object. The mechanical seal assembly also includes a fastener passing through a hole in the stopper such that the fastener is actuatable from outside of the tubular object to force the surface of the stopper against the inner circumferential surface of the tubular object.

BRIEF DESCRIPTION OF THE DRAWINGS

The present invention is described below by reference to the following drawings, in which:

FIG. 3 shows a radial cross-sectional view of the mechanical seal assembly of the first embodiment fixed to the curved tube;

FIG. 4 shows an axial cross-sectional view of the mechanical seal assembly of the first embodiment fixed to the curved tube;

FIG. 5 shows a perspective view of a strongback of the mechanical seal assembly of the first embodiment;

FIG. 6 shows a perspective view of a stopper and fasteners of the mechanical seal assembly of the first embodiment;

DETAILED DESCRIPTION

The present disclosure provides a mechanical seal assembly configured for sealing an opening in tubular object in a nuclear power plant. In particular, the mechanical sealing assembly can be used on a six inch curved pipe of a feedwater sparger of a boiling water reactor (BWR). The mechanical seal assembly can be used to seal a hole that has been cut into a tubular object to remove foreign material trapped in the tubular object. In particular, to remove foreign material from a tubular object in a nuclear power plant, in particular in a location that is inaccessible by Foreign Object Search and Retrieval (FOSAR) tools, a hole can be cut that extends from an outer circumferential surface to an inner circumferential surface of the tubular object. The foreign material can be removed from the tubular object through the hole, then the mechanical seal assembly can be used to seal the hole.

The use of the such a technique to remove the foreign material and seal the hole may have a number of advantageous features:

- the mechanical seal assembly can include a precision machined seal plate mounted inside a sparger, a strongback mounted outside the sparger and two bolts with integrated crimp cups to hold it all together;
- the strongback is not welded to the pipe, but is interlocked between the external pipe surface surrounding the pipe hole, and the bolts of the seal plate associated with the edge of the seal plate can be blocked to the internal perimeter of the pipe hole,
- the seal plate can be designed to fit inside a curved pipe;
- the seal plate can be tuned to provide a specific flexure to maintain bolt pre-load over the life of the system;
- the bolts can held in place by an expanding crimp cup design;
- the EDM hole can be dimensioned to allow the seal plate to be introduced inside the pipe in a given position so the seal plate can be then moved in a sealing position where the edge of the seal plate is in contact with the internal perimeter of the pipe hole, the mechanical seal assembly can be designed to be delivered and installed remotely, underwater; in a BWR environment;

the mechanical seal assembly can be a permanent solution, but it can be removed in the future if required;

the mechanical seal assembly can provide a 100% leak proof seal or it can be designed to be less than a 100% leak proof seal, depending on what is acceptable per analysis of feedwater flow through the sparger;

the mechanical seal assembly can be implemented with fuel in place in the vessel; and/or the mechanical seal assembly can maintain radiation exposure ALARA.

Figure 1:
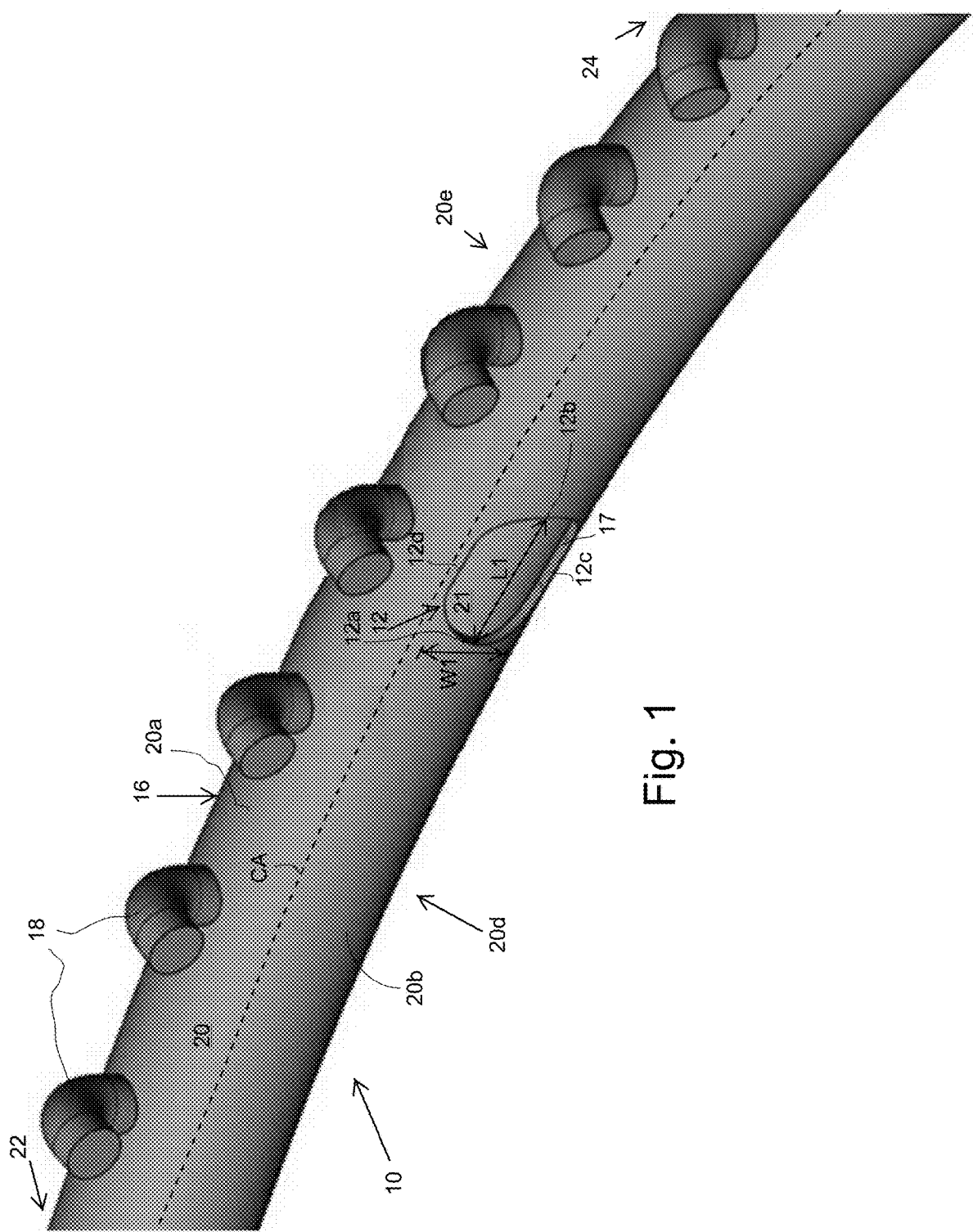
FIG. 1 shows a perspective view of a portion of a BWR feedwater sparger assembly with an opening cut therein in accordance with an embodiment of the present invention.
Figure 2:
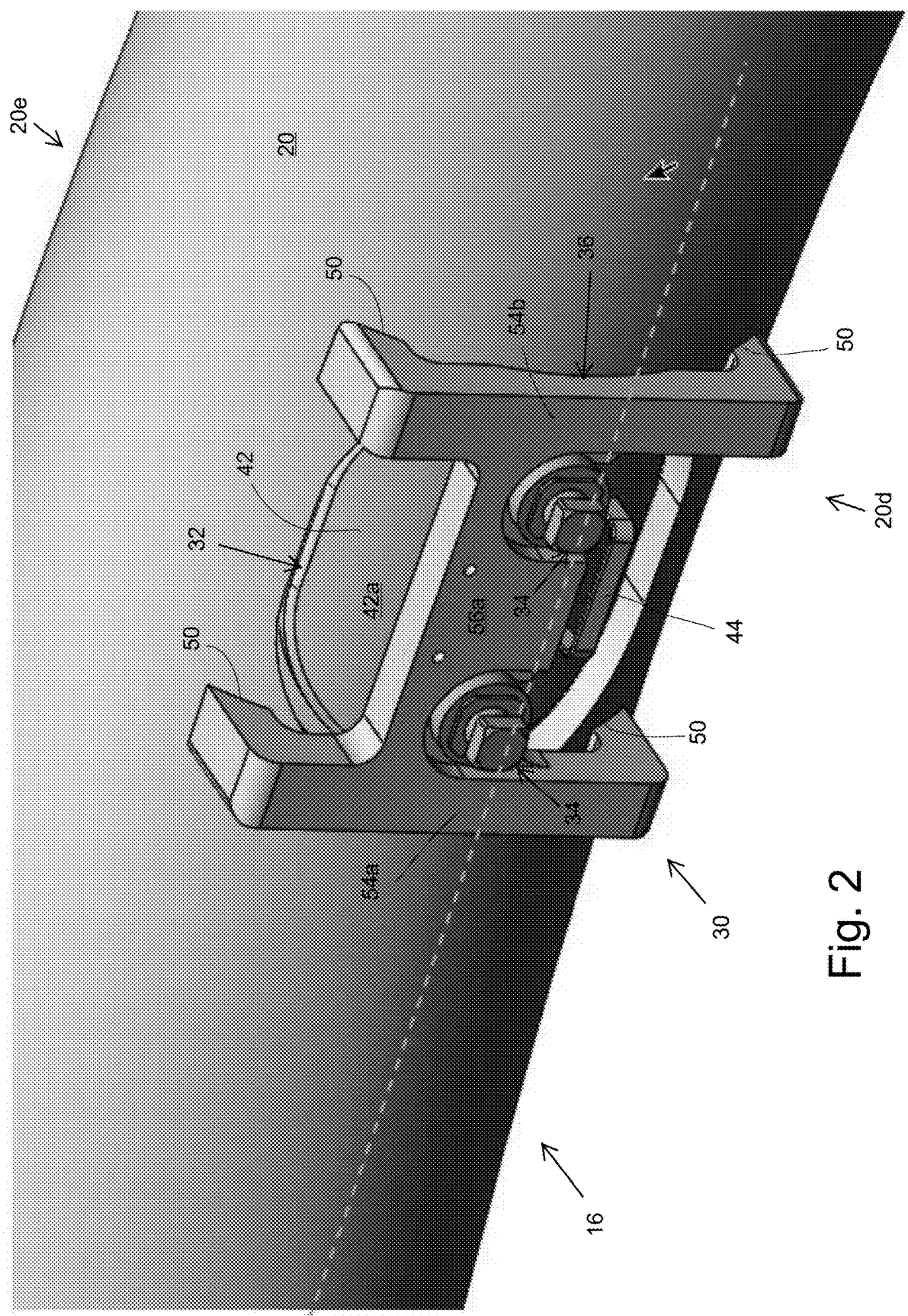
FIG. 2 shows a perspective view of a mechanical seal assembly in accordance with a first embodiment of the present invention fixed to a curved tube of the BWR feedwater sparger assembly sealing the opening.
Figure 7:
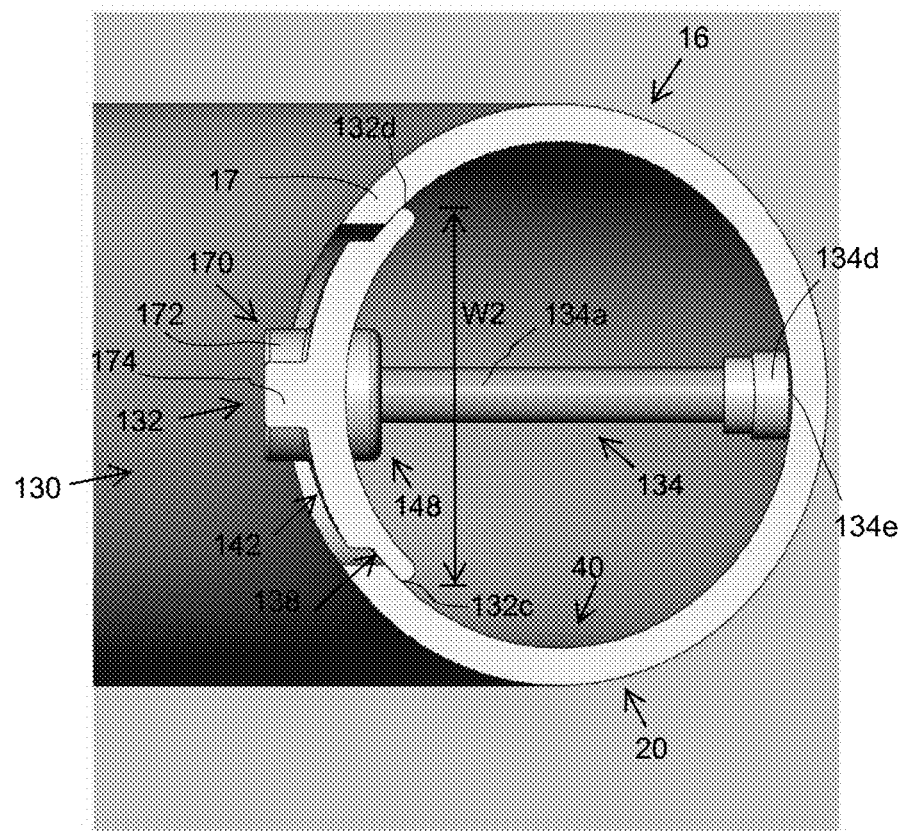
FIG. 7 shows an axial cross-sectional view of a mechanical seal assembly in accordance with a second embodiment of the present invention fixed to a curved tube of the BWR feedwater sparger assembly sealing the opening.
Figure 8:
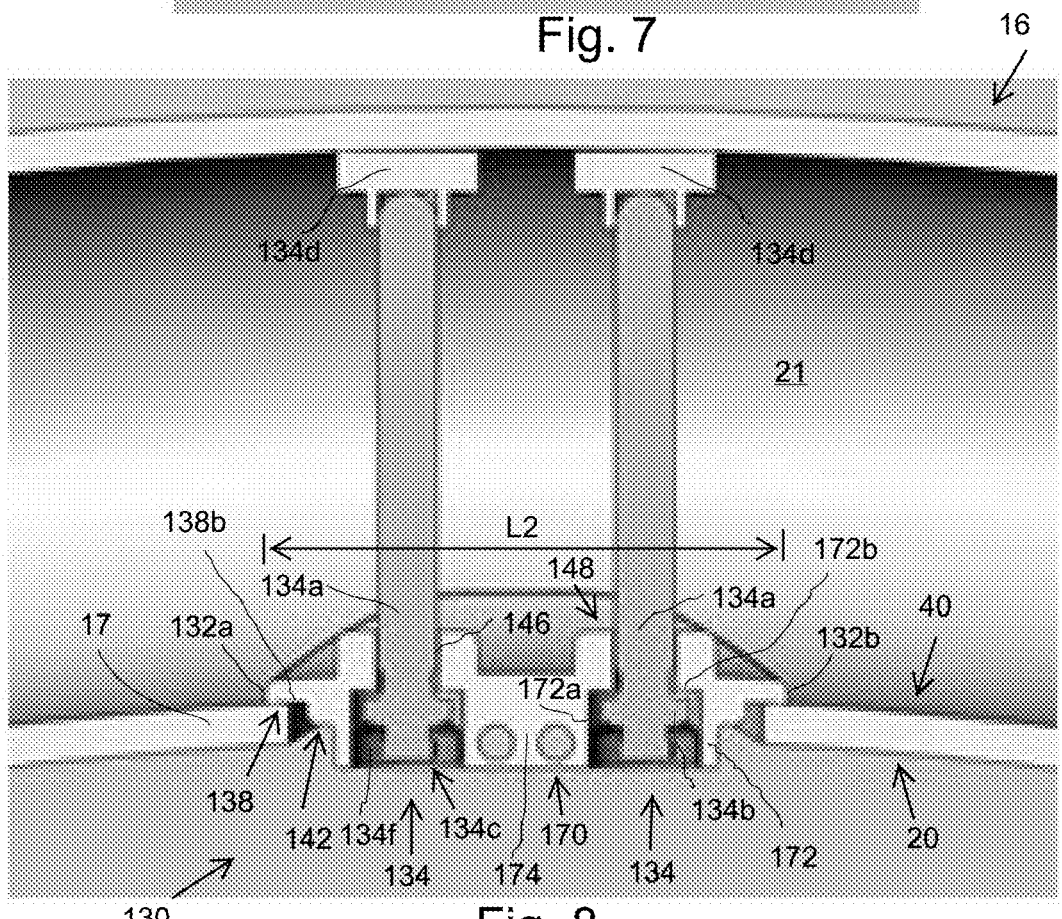
FIG. 8 shows a radial cross-sectional view of the mechanical seal assembly of the second embodiment fixed to the curved tube.

FIG. 1 shows a perspective view of a portion of a BWR feedwater sparger assembly 10 with an opening 12 cut therein in accordance with an embodiment of the present invention. In one preferred embodiment, the opening 12 is cut via electrical discharge machining (EDM) apparatus, but other cutting techniques may also be used, for example using a machine tool, or a saw. As schematically shown in FIG. 1, BWR feedwater sparger assembly 10 includes an enclosure in the form of a curved tube 16, with a plurality of nozzles 18 protruding from a top 20a of an outer circumferential surface 20 of curved tube 16. Curved tube 16 is considered as having a curved shape because its center axis CA follows an arced path while extending longitudinally from a first end 22 to a second end 24, such that an interior edge 20b of outer circumferential surface 20—i.e., an edge facing a center axis of the pressure vessel—has a concave shape when extending axially with respect to center axis CA and an exterior edge 20c (FIGS. 3, 4) of outer circumferential surface 20—i.e., an edge facing away from the center axis of the pressure vessel—has a convex shape when extending axially with respect to center axis CA, as seen in the radially facing cross-sectional view of FIG. 3.

Opening 12 is cut into an interior facing portion 20d of outer circumferential 20 that includes interior edge 20b by removing material from a curved wall 17 at interior facing portion 20d. Using EDM, opening 12 is cut without creating foreign material (FM). Curved wall 17 is cut through from outer circumferential surface 20 to an inner circumferential surface 40 (FIG. 3, 4) of tube 16 to form opening 12. Inner circumferential surface 40 at wall 17 has a convex shape when extending axially with respect to center axis CA, as seen in the radially facing cross-sectional view of FIG. 3, and a concave shape when extending circumferentially with respect to center axis CA, as seen in the axially facing cross-sectional view of FIG. 3.

EDM may use electrical discharges to remove material from curved wall 17 of curved tube 16 to form an elliptical cut creating the elliptical opening 12. After opening 12 is cut into tube 16, a tool or a human operator's hand may be inserted through opening 12 into an interior 21 of tube 16 to remove the foreign object trapped inside of tube 16. As shown in FIG. 1, opening 12 includes a length L1 extending between longitudinal edges 12a, 12b and a width W1 extending between lateral edges 12c, 12d that is less than length L1. Length L1 defines a maximum perimeter dimension of opening 12 at outer circumferential surface 20 and width W1 defines a minimum perimeter dimension of opening 12 at outer circumferential surface 20.

FIGS. 2 to 6 show views of a mechanical seal assembly 30 in accordance with a first embodiment of the present invention sealing the opening 12 cut into curved tube 16. Seal assembly 30 includes a stopper 32 formed as a stainless steel machined plate, at least one fastener in the form of two bolts 34 and a strongback 36 for supporting bolts 34. As shown in FIG. 6, which shows a perspective view of stopper 32 and bolts 34, stopper 32 has a length L2 extending between longitudinal edges 32a, 32b and a width W2 extending between lateral edges 32c, 32d that is less than length L2. Length L2 defines a maximum perimeter dimension of stopper 32 and width W2 defines a minimum perimeter dimension of stopper 32. Width W2 of stopper 32 is less than length L1 of opening 12 such that stopper 32 can be oriented widthwise and inserted through opening 12 into interior 21 of tube 16. Length L2 of stopper 32 is greater than length L1 of opening 12 and width W2 of stopper 32 is greater than width W1 of opening 12 such that stopper 32 can plug opening 12.

Stopper 32 includes an outer ring 38 whose outer extent defines an outer perimeter 38a of stopper 32 having an elliptical shape. Outer ring 38 includes an exterior surface 38b for facing away from interior 21 of tube 16 that is configured for contacting an inner circumferential surface 40 of tube 16. Surface 38b has a curved shape that defines two convex surface portions 38c, 38d extending widthwise and two concave surface portions 38e, 38f extending lengthwise, which allow surface 38b to match the shape of the inner circumferential surface 40 of tube 16, due to the curved shape of tube 16 described above with respect to FIG. 1. A first convex surface portion 38c extends from lateral edge 32d past longitudinal edge 32a to lateral edge 32c to define a convex shape and a second convex surface portion 38d extends from lateral edge 32d past longitudinal edge 32b to lateral edge 32c to define a convex shape. A first concave surface portion 38e, which overlaps with portions 38c, 38d, extends from longitudinal edge 32a past lateral edge 32d to longitudinal edge 32b to define a concave shape and second concave surface portion 38f, which overlaps with portions 38c, 38d, extends from longitudinal edge 32a past lateral edge 32c to longitudinal edge 32b to define a concave shape.

Stopper 32 also includes a central portion 42 inside of outer ring 38. Central portion 42 is also used as an aid in positioning stopper 32 in opening 12, by allowing a remote operator to know if the stopper 32 is installed to completely seal the opening 12, i.e., confirming that stopper 32 is not shifted too high or too low in the pipe. Central portion 42 joins an inner perimeter of outer ring 38 and protrudes away from outer ring 38 such that central portion 42 is thicker than outer ring 38 and extends partially into opening 12. Central portion 42 includes an exterior surface 42a for facing away from interior 21 of tube 16 that, similar to outer ring 38, has a concave shape extending in the lengthwise direction and a convex shape extending in the widthwise direction. Central portion 42 also has an elliptical shape perimeter that defines two longitudinal edges 42b, 42c and two lateral edges 42d, 42e. A handle 44 is fixed to exterior surface 42a for gripping by a tool or human operator. Stopper 32 includes threaded holes 46 extending therethrough configured for receiving threaded shafts 34a of bolts 34. On an interior side thereof, stopper 32 includes protrusions 48 forming a thickened portion of stopper 32 to extend the length of threaded holes 46.

Strongback 36 is configured for contacting outer circumferential surface 20 of tube 16. More specifically, strongback 36 includes a plurality of contact surfaces 50 configured for contacting outer circumferential surface 20. Each contact surface 50 is formed at an end 52a, 52b, 52c, 52d of one of legs 54a, 54b of strongback 36. More specifically, strongback 36 includes two legs 54a, 54b, with a first leg 54a including two ends 52a, 52b for contacting surface 20 and a second leg 54b including two ends 52c, 52d for contacting surface 20. Strongback 36 also includes a central bar 56 connecting legs 54a, 54b. Central bar 56 includes two slots 58 formed therein, each for receiving one of bolts 34. Slots 58 are each surrounded by a flange 60 recessed below an exterior surface 56a of central bar 56. Flanges 60 form shoulders each configured for contacting an annular collar 34b of a head 34c of the respective one of bolts 34.

A method of installing seal assembly 30 will now be described. First, stopper 32 is orientated such that the width of stopper 32 is aligned with the length of opening 12 and stopper 32 is passed through opening 12 such that lateral edges 32c, 32d of stopper 32 face longitudinal edges 12a, 12b of opening 12 as stopper 32 is being passed through opening 12. More specifically, one of the two longitudinal edges 32a, 32b of stopper is first passed through opening 12, then lateral edges 32c, 32d are passed through opening 12, and then lastly the other of the two longitudinal edges 32a, 32b is passed through opening 12. After stopper 32 is passed through opening 12 into interior 21 of tube 16, stopper 32 is rotated such that exterior surface 42a is facing opening 12, and then stopper 32 is pulled toward opening 12 so that exterior surface 38b of outer ring 38 contacts inner circumferential surface 40 of tube 16. As outer ring 38 contacts inner circumferential surface 40 of tube 16, central portion 42 penetrates at least partially into opening 12 such that longitudinal edges 42b, 42c of central portion 42 face and are directly adjacent to longitudinal edges 12a, 12b, respectively, of opening 12 and lateral edges 42d, 42e of central portion 42 face and are directly adjacent to lateral edges 12c, 12d, respectively, of opening 12.

Figure 10:
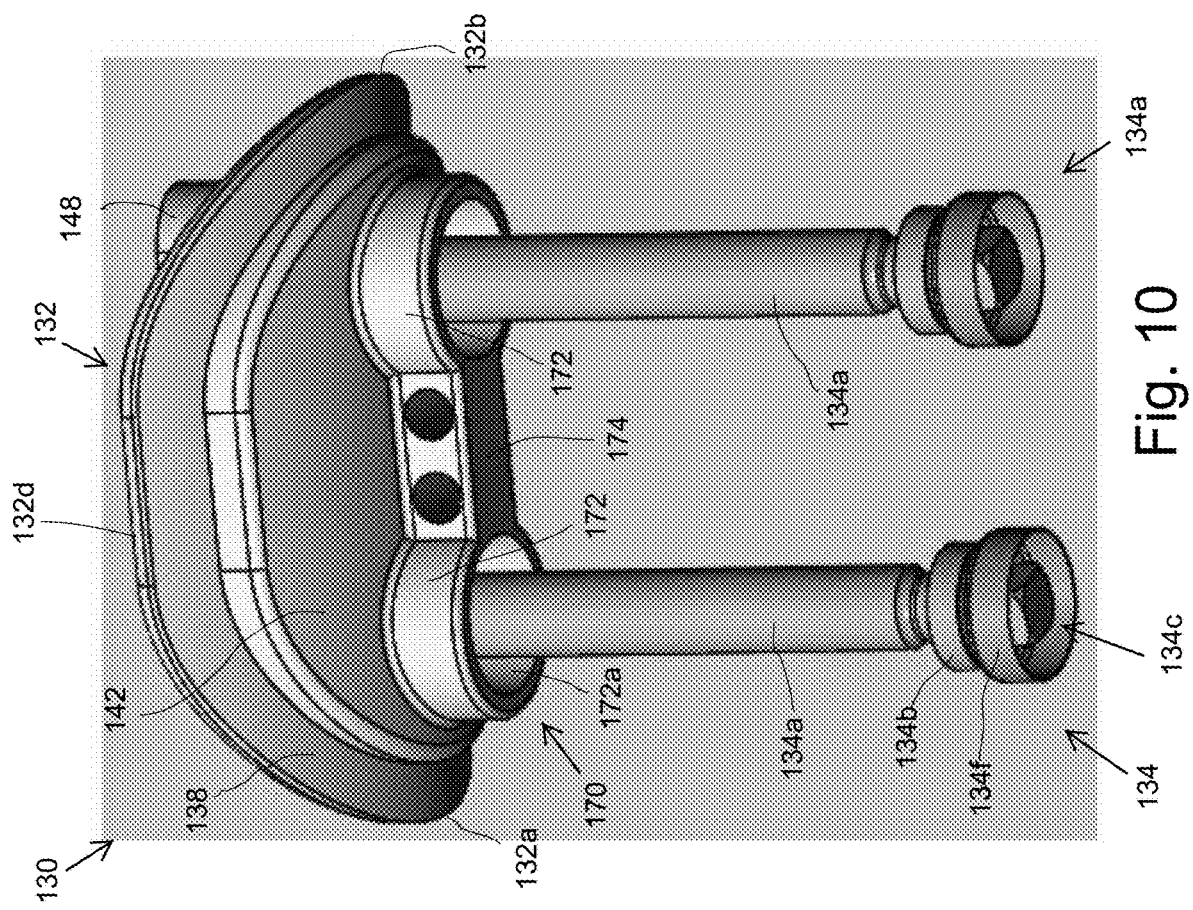
FIG. 10 shows a perspective view of a stopper and fasteners of the mechanical seal assembly of the second embodiment.
Figure 9:
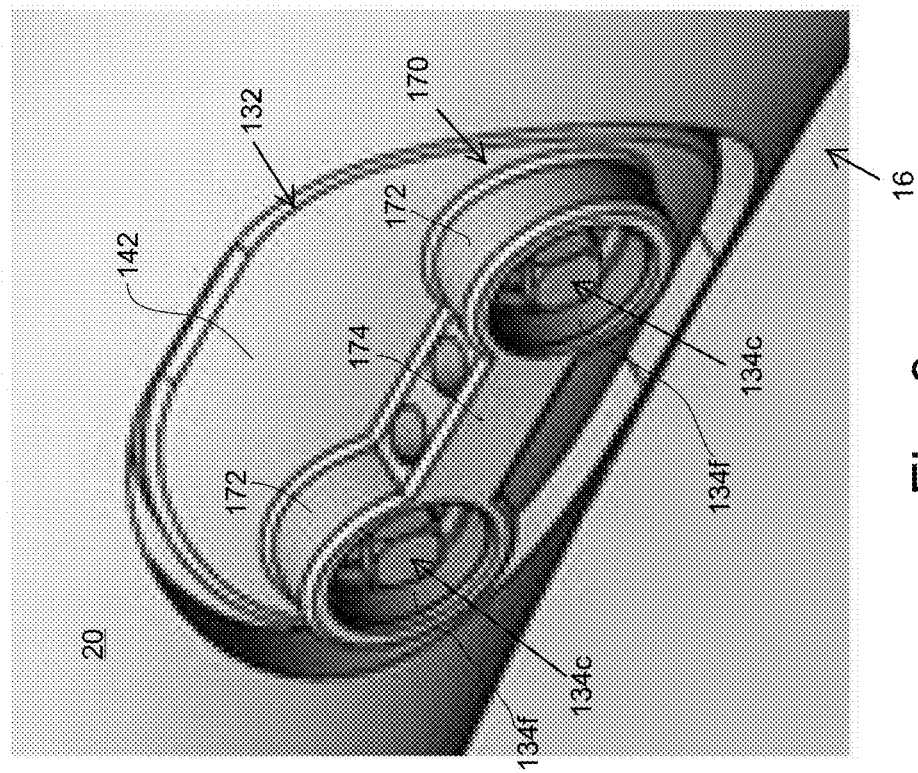
FIG. 9 shows a perspective view of the mechanical seal assembly of the second embodiment fixed to the curved tube.

After stopper 32 is inserted into opening 12, heads 34c and parts of shafts 34a of bolts 34 protrude outside of tube 16. Strongback 36 is then slid onto bolts 34 such that shafts 34a of bolts 34 are received in slots 58. Then, the bolts 34 are actuated from the outside of outer circumferential surface 20 of tube 16 to force stopper 32 radially outward with respect to center axis CA to seal opening 12. More specifically, heads 34c of bolts 34 are torqued with a tool such that shafts 34a move further into threaded holes 46 and annular collars 34b of bolts 34 are forced into flanges 60. This torquing of bolts 34 into a tightened position tensions bolts 34 and pulls strongback 36 and stopper 32 closer together such that exterior surface 38b of outer ring 38 of stopper 32 is pressed tightly against inner circumferential surface 40 of tube 16 and surfaces 50 of strongback 36 are pressed tightly against outer circumferential surface 20 of tube 16. This tightening of bolts 34 causes stopper 32 to sealingly engage inner circumferential surface 40 of tube 16 to minimize leakage out of tube 16 during operation of sparger assembly 10. Locking cups (similar to locking cups 134f shown in FIGS. 9 and 10) are utilized to secure the bolts 34. The locking cups are co-axial with the head 34c of the bolts 34, and a crimping tool is used to crimp the locking cups around the head 34c, blocking bolt 34 in position.

The method described with respect to FIGS. 2 to 6 can be accomplished by delivering the stopper 32, with bolts 34 preinstalled in holes 46, via a first long pole handling tool to sparger assembly 10 inside the pressure vessel and then delivering strongback 36 via a second long pole handling tool and holding the strongback 36 in place via the second long pole handling tool. Then, a third long pole handling tool with a right angle drive tool can be used to tighten the bolts 34 to apply a clamping load. Finally, the crimping tool can be used to crimp the locking cups. The long pole handling tools can be maneuvered from a refueling bridge or an auxiliary bridge located above the pressure vessel.

FIGS. 7 to 11 show views of a mechanical seal assembly 130 in accordance with a second embodiment of the present invention sealing the opening 12 cut into curved tube 16. Seal assembly 130 includes a stopper 132 formed as curved plate and at least one fastener in the form of two bolts 134. Same as stopper 32, stopper 132 includes a length L2 extending between longitudinal edges 132a, 132b and a width W2 extending between a lateral edge 132c, 132d that is less than length L2, with length L2 defining a maximum perimeter dimension of stopper 132 and width W2 defines a minimum perimeter dimension of stopper 132. Width W2 of stopper 132 is less than length L1 of opening 12 such that stopper 132 can be oriented widthwise and inserted through opening 12 into interior 21 of tube 16. Length L2 of stopper 132 is greater than length L1 of opening 12 and width W2 of stopper 132 is greater than width W1 of opening 12 such that stopper 132 can plug opening 12.

Stopper 132 is formed in substantially the same manner as stopper 32, with the differences from stopper 32 being the configuration of holes 146 for receiving bolts 134 in stopper 132, stopper 132 including an exterior support assembly 170 for bolts 134 and stopper 132 not having a handle 44. Accordingly, stopper 132 includes an outer ring 138 formed in the same manner as outer ring 38 and a central portion 142 formed in the same manner as central portion 42. Stopper 132 includes threaded holes 146 extending therethrough configured for receiving threaded shafts 134a of bolts 134. On an interior side thereof, stopper 132 includes protrusions 148 formed in the same manner as protrusions 48 to extend the length of threaded holes 146.

Bolts 134 each include a foot 134d formed at a distal end thereof for contacting inner circumferential surface 40 of tube 16 directly opposite of opening 12. Each foot 134d extends past the outer diameter of the respective shaft 134a. Each foot 134d is includes a curved contact surface 134e such that the foot 134d can maximize contact between contact surface 134e of foot 134d and inner circumferential surface 40. Bolts 134 each include a head 134c formed at a proximal end thereof for being received in exterior support assembly 170 of stopper 132. Each head 134c includes an annular collar 134b and has a locking cup 134f non-rotatably attached thereto for securing the bolt 134 in place after installation.

Exterior support assembly 170 includes a two receptacles 172 protruding from an exterior surface 142a of central portion 142 and a support bar 174 connecting receptacles 172. Each receptacle 172 is cylindrically shaped and includes an inner cylindrical surface 172a and an annular surface 172b defining a bore therein. When bolts 134 are installed in their tightened position in receptacles 172, heads 134c and locking cups 134f are received in receptacles 172 and annular collar 134b abuts annular surface 172b. Locking cups 134f are then forced radially outward with respect to a center axis of the respective bolt 134, about which the bolt 134 is rotated about during installation, by a crimping tool into form-fitting contact with cylindrical surface 172a such that bolts 134 are secured in place at are prevented from loosening.

Figure 11:
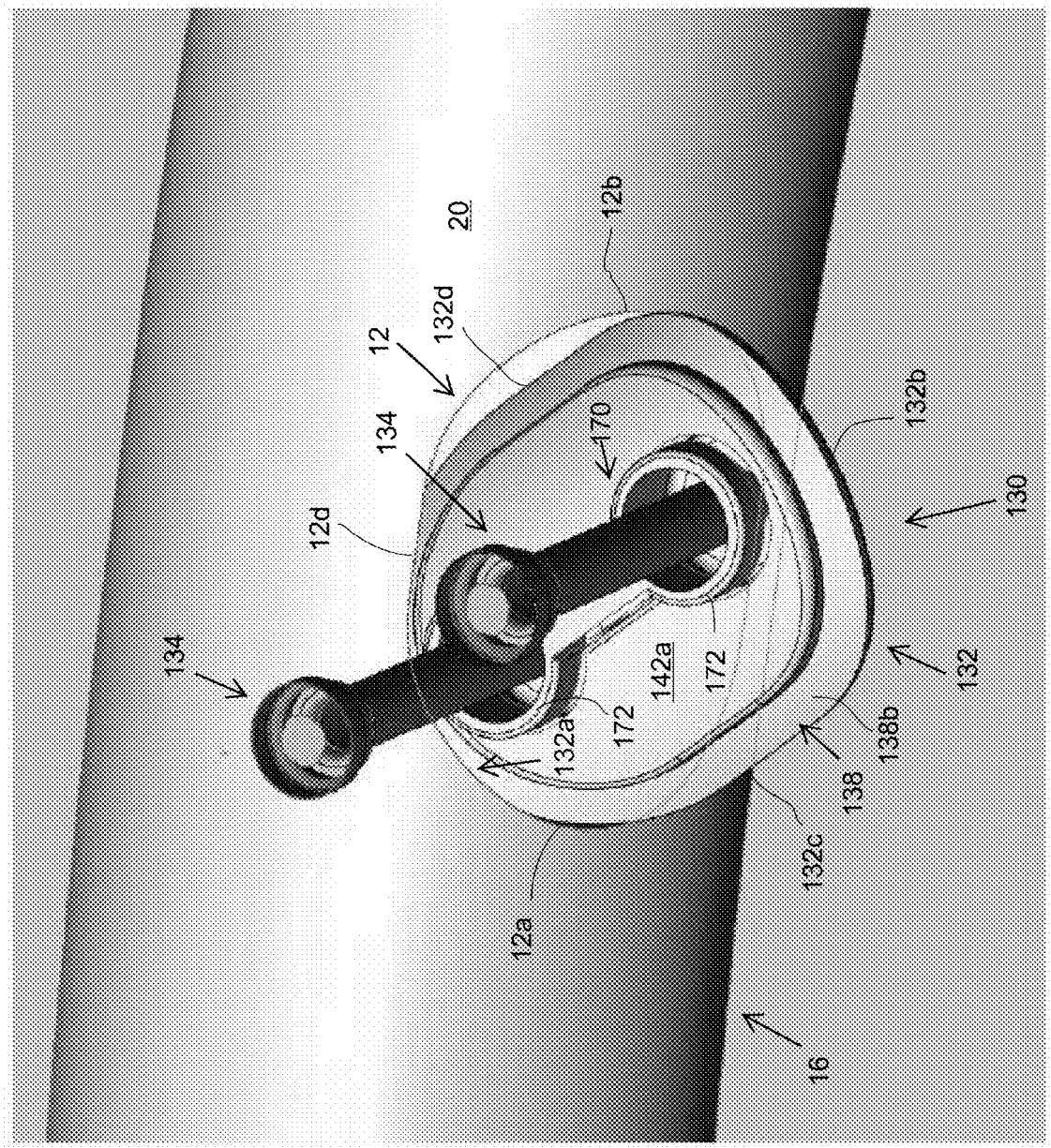
FIG. 11 shows a perspective view of the stopper and fasteners of the mechanical seal assembly of the second embodiment being inserted through the opening of the curved tube into the curved tube.

A method of installing seal assembly 130 will now be described. First, stopper 132 is orientated such that the width of stopper 132 is aligned with the length of opening 12 and stopper 132 is passed through opening 12 such that lateral edges 132c, 132d of stopper 132 face longitudinal edges 12a, 12b of opening 12 as stopper 132 is being passed through opening 12. More specifically, as shown in FIG. 11, one of the two longitudinal edges 132a, 132b of stopper 132 (edge 132a in FIG. 11) is first passed through opening 12, then lateral edges 132c, 132d are passed through opening 12, and then lastly the other of the two longitudinal edges 132a, 132b (edge 132b in FIG. 11) is passed through opening 12. After stopper 132 is passed through opening 12 into interior 21 of tube 16, stopper 132 is rotated such that exterior surface 142a is facing opening 12, and then stopper 32 is pulled toward opening 12 so that exterior surface 138b of outer ring 138 contacts inner circumferential surface 40 of tube 16. As outer ring 138 contacts inner circumferential surface 40 of tube 16, central portion 142 penetrates at least partially into opening 12 and exterior support assembly 170 extends out of opening 12 past outer circumferential surface 20.

After stopper 132 is inserted into opening 12, heads 134c and parts of shafts 134a of bolts 134 protrude outside of tube 16. Bolts 134 are then actuated from the outside of outer circumferential surface 20 of tube 16 to force stopper 132 radially outward with respect to center axis CA to seal opening 12. More specifically, heads 134c of bolts 134 are torqued with a tool such that shafts 134a move further into threaded holes 146, feet 134d are forced into inner circumferential surface 40 and annular collars 134b of bolts 134 are forced into annular surfaces 172b. This torquing of bolts 134 into a tightened position compresses bolts 134 and pulls stopper 132 away from feet 134d and toward opening 12 such that exterior surface 138b of outer ring 138 of stopper 132 is pressed tightly against inner circumferential surface 40 of tube 16. This tightening of bolts 134 causes stopper 132 to sealingly engage inner circumferential surface 40 of tube 16 to minimize leakage out of tube 16 during operation of sparger assembly 10. Cups 134f can then be forced radially outward with respect to the center axis of the respective bolt 134 by the crimping tool into form-fitting contact with cylindrical surface 172a such that bolts 134 are secured in place and prevented from loosening.

The method described with respect to FIGS. 7 to 11 can be accomplished by delivering the stopper 132, with bolts 134 preinstalled in holes 146, via a first long pole handling tool to sparger assembly 10 inside the pressure vessel and holding the stopper 132 in place via the first long pole handling tool. Then, a second long pole handling tool with a right angle drive tool can be used to tighten the bolts 134 to apply a clamping load. Finally, the crimping tool can be used to crimp the locking cups 134f.

Figure 12A:
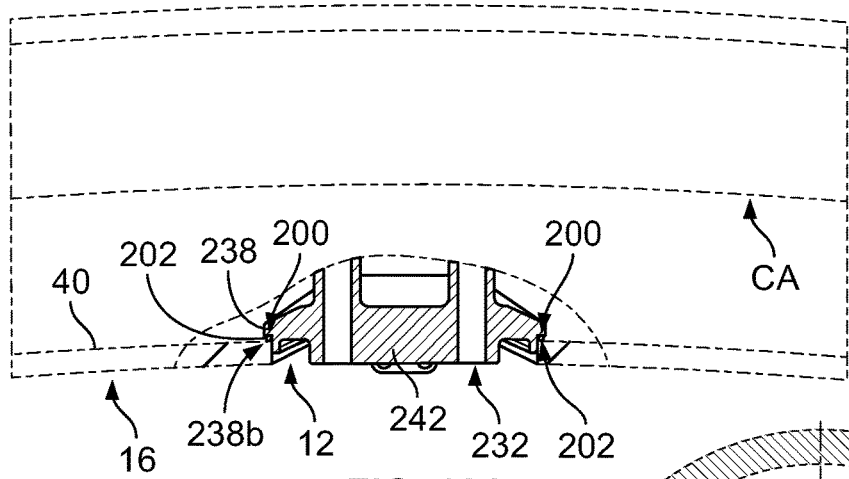
FIGS. 12a to 12c show views of a stopper in accordance with a third embodiment of the present invention.
Figure 12B:
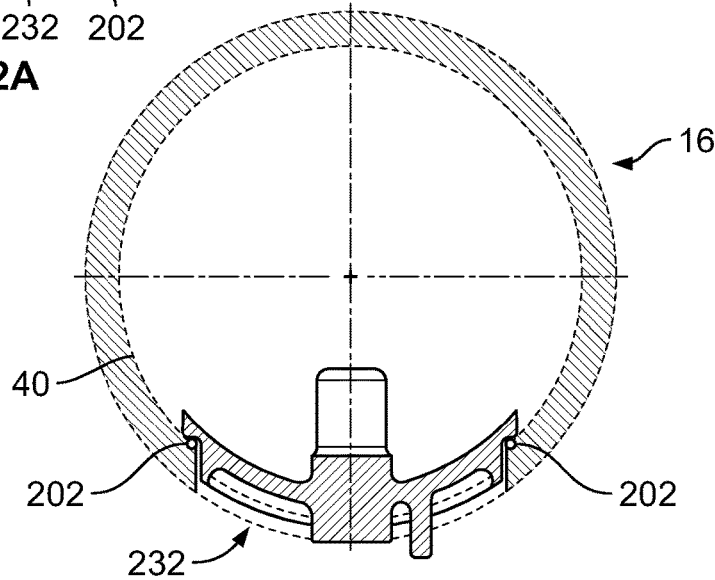
Figure 12C:
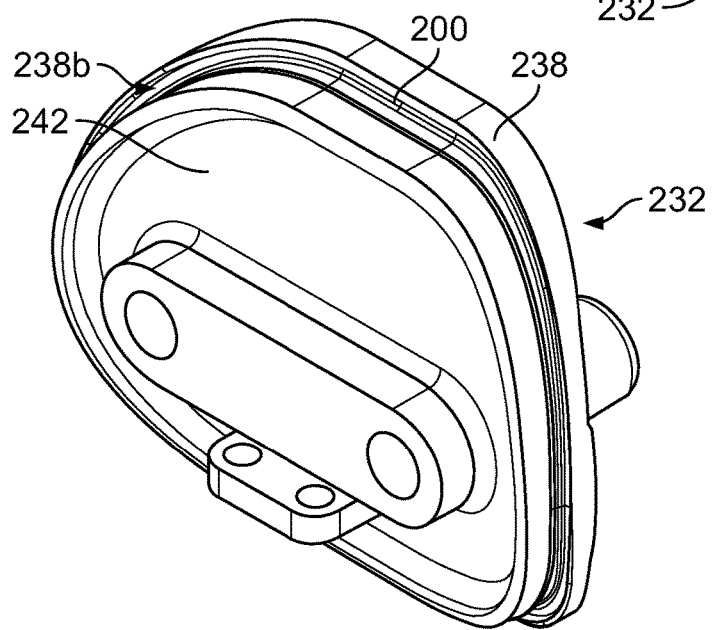

FIGS. 12a to 12c show views of a stopper 232 in accordance with another embodiment of the present invention. Stopper 232 is used in the same manner as stopper 132, with bolts 134, but includes a groove 200 formed therein receiving a gasket 202. Stopper 232 includes a central portion 242 formed in a similar manner as central portions 42, 142 and an outer ring 238 formed in a similar manner as outer rings 38, 138, with a main difference being that outer ring 238 is provided with a groove 200 formed in exterior surface 238b of outer ring 238. Groove 200 is continuous and completely surrounds central portion 242. Gasket 202 is provided in groove 200 and completely surrounds central portion 242. When stopper 232 is installed on tube 16, as shown in FIGS. 12a and 12b, gasket 202 contacts inner circumferential surface 40 of tube 16 and completely surrounds opening 12. It should be noted that stoppers 32, 132 and 332 (described below) can be provided with a groove and gasket in the same manner as groove 200 and gasket 202.

Figure 13:
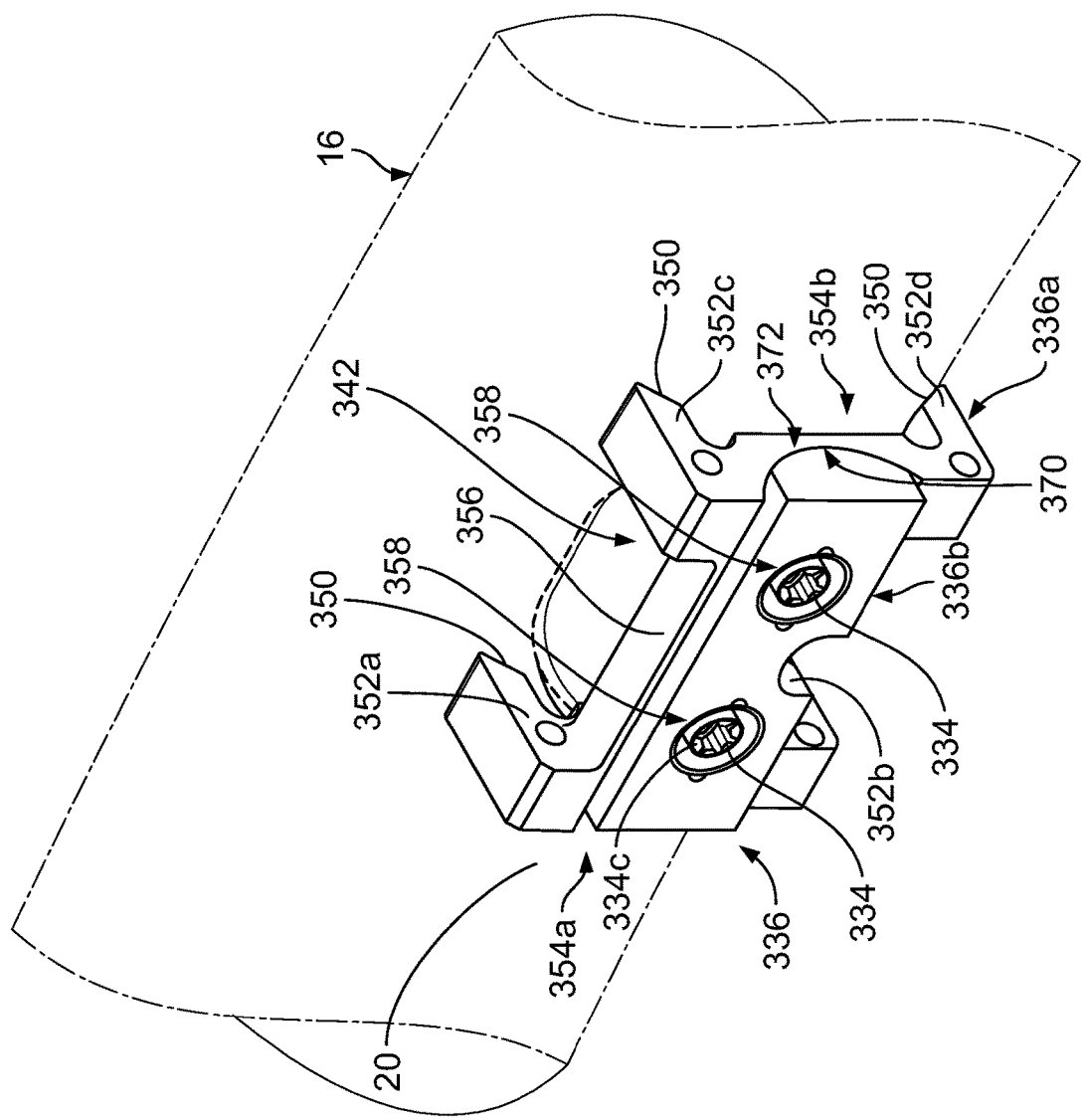
FIG. 13 shows a view of a stopper in accordance with a fourth embodiment of the present invention.

FIG. 13 shows a view of a stopper 332 in accordance with another embodiment of the present invention. Stopper 332 is formed in substantially the same manner as stopper 32, except that stopper 332 includes a two-piece strongback 336. Strongback 336 includes a first piece 336a configured for contacting outer circumferential surface 20 of tube 16 and a second piece 336b for receiving heads 334c of bolts 334. More specifically, strongback piece 336a includes a plurality of contact surfaces 350 configured for contacting outer circumferential surface 20. Each contact surface 350 is formed at an end 352a, 352b, 352c, 352d of one of legs 354a, 354b of strongback piece 336a. Strongback piece 336a also includes a central bar 356 connecting legs 354a, 354b. Strongback piece 336b extends along central bar 356 from leg 354a to leg 354b and includes two slots 358 formed therein, each for receiving one of heads 334c of bolts 334. Strongback piece 336b includes a convex surface 370 that is received in a concave groove 372 in piece 336a. The two piece construction of strongback 336 optimizes stress distribution in the strongback piece 336b contacting the tube 16 as bolts 334 are tightened to allow precise control over the preload due to the asymmetrical nature of the strongback 336.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for sealing an opening extending radially from an outer circumferential surface to an inner circumferential surface of a tubular object in a nuclear power plant, the method comprising:
   inserting a stopper from outside of the outer circumferential surface through the opening into the tubular object; and
   actuating a fastener from the outside of the circumferential surface to force the stopper radially outward to seal the opening, wherein the tubular object is part of a feedwater sparger assembly of a nuclear reactor.

2. The method as recited in claim 1 wherein the stopper includes an outer ring having a shape matching a shape of the inner circumferential surface of the tubular object surrounding the opening, the actuating of the fastener forcing the outer ring against the inner circumferential surface of the tubular object surrounding the opening.

3. The method as recited in claim 1 wherein the stopper includes a threaded hole passing therethrough receiving the fastener, the actuating of the fastener including torquing the fastener in the hole.

4. The method as recited in claim 1 wherein the opening has a first length extending between longitudinal edges of the opening and a first width extending between lateral edges of the opening, the first width being less than the first length, the first length defining a maximum perimeter dimension of the opening and the first width defining a minimum perimeter dimension of the opening.

5. The method as recited in claim 4 wherein the stopper has a second length extending between longitudinal edges of the stopper and a second width extending between lateral edges of the stopper, the second width being less than the second length, the second length defining a maximum perimeter dimension of the stopper and the first width defining a minimum perimeter dimension of the stopper, the second length being greater than the first length, the second width being greater than the first width, the second width being less than the first length.

6. The method as recited in claim 5 wherein the inserting of the stopper through the opening includes orienting the stopper widthwise and passing the stopper through the opening such that the lateral edges of the stopper face the longitudinal edges of the stopper as the stopper is inserted through the opening.

7. The method as recited in claim 1 wherein the tubular object has a curved shape such that a center axis of the tubular object follows an arced path while extending longitudinally from a first end to a second end of the tubular object.

8. The method as recited in claim 1 further comprising sliding a strongback onto the fastener before the actuating of the fastener.

9. The method as recited in claim 8 wherein the actuating of the fastener forces surfaces of the strongback against the outer circumferential surface of the tubular object and moving the strongback and the stopper closer together.

10. The method as recited in claim 1 wherein the actuating of the fastener causes the fastener to contact the inner circumferential surface of the tubular object opposite of the opening.

11. The method as recited in claim 10 wherein after the fastener contacts the inner circumferential surface of the tubular object opposite of the opening the fastener is further torqued to compress the fastener between the stopper and the inner circumferential surface of the tubular object opposite of the opening.

12. A method for removing material from an inaccessible region of an enclosure in a nuclear power plant, the method comprising:
    cutting through a wall of the enclosure to form an opening passing through the wall;
    removing the material through the opening;
    inserting a stopper into the enclosure through the opening from outside of the enclosure; and then
    actuating a fastener from the outside of the enclosure to force the stopper against the wall to seal the opening.

13. The method as recited in claim 12 wherein the cutting through the wall is performed by electrical discharge machining.

14. The method as recited in claim 12 wherein the enclosure is a tubular object, the stopper including a surface matching an inner circumferential surface of the tubular object, the actuating of the fastener including forcing the surface of the stopper against the inner circumferential surface of the tubular object.

15. The method as recited in claim 12 wherein the stopper includes a threaded hole passing therethrough receiving the fastener, the actuating of the fastener including torquing the fastener in the hole.

16. The method as recited in claim 12 wherein the opening has a first length extending between longitudinal edges of the opening and a first width extending between lateral edges of the opening, the first width being less than the first length, the first length defining a maximum perimeter dimension of the opening and the first width defining a minimum perimeter dimension of the opening, the stopper having a second length extending between longitudinal edges of the stopper and a second width extending between lateral edges of the stopper, the second width being less than the second length, the second length defining a maximum perimeter dimension of the stopper and the first width defining a minimum perimeter dimension of the stopper, the second length being greater than the first length, the second width being greater than the first width, the second width being less than the first length.

17. The method as recited in claim 12 further comprising sliding a strongback onto the fastener before the actuating of the fastener, the actuating of the fastener forcing surfaces of the strongback against an outer circumferential surface of the tubular object and moving the strongback and the stopper closer together.

18. The method as recited in claim 12 wherein the actuating of the fastener causes the fastener to contact an inner circumferential surface of the tubular object opposite of the opening and after the fastener contacts the inner circumferential surface of the tubular object opposite of the opening the fastener being further torqued to compress the fastener between the stopper and the inner circumferential surface of the tubular object opposite of the opening.

19. A mechanical seal assembly for plugging an opening in a tubular object by contacting an inner circumferential surface of the tubular object, the mechanical seal assembly comprising:
    a stopper configured for insertion into an interior of the tubular object for plugging the opening, the stopper including a surface configured for matching the inner circumferential surface of the tubular object; and
    a fastener passing through a hole in the stopper such that the fastener is actuatable from outside of the tubular object to force the surface of the stopper against the inner circumferential surface of the tubular object, wherein the tubular object is part of a feedwater sparger assembly of a nuclear reactor and the mechanical seal assembly is configured for use in on the feedwater sparger assembly.

* * * * *